United States Patent [19]
Gray

[11] Patent Number: 6,151,345
[45] Date of Patent: Nov. 21, 2000

[54] LASER POWER CONTROL WITH STRETCHED INITIAL PULSES

[75] Inventor: Damien F. Gray, Austin, Tex.

[73] Assignee: DTM Corporation, Austin, Tex.

[21] Appl. No.: 09/111,392

[22] Filed: Jul. 7, 1998

[51] Int. Cl.[7] ...................................................... H01S 3/00
[52] U.S. Cl. ................................ 372/38; 372/25; 372/29; 372/33
[58] Field of Search ................................. 372/9, 10, 25, 372/29, 30, 33, 38

[56] References Cited

U.S. PATENT DOCUMENTS

| | | | |
|---|---|---|---|
| 3,617,932 | 11/1971 | Paoli et al. | 372/25 X |
| 4,247,508 | 1/1981 | Housholder | 264/219 |
| 4,540,867 | 9/1985 | Ackerman | 219/121 |
| 4,590,598 | 5/1986 | O'Harra, II | 372/38 |
| 4,863,538 | 9/1989 | Deckard | 156/62.2 |
| 4,944,817 | 7/1990 | Bourell et al. | 156/62.2 |
| 5,014,207 | 5/1991 | Lawton | 364/468 |
| 5,017,753 | 5/1991 | Deckard | 219/121.63 |
| 5,076,869 | 12/1991 | Bourell et al. | 156/62.2 |
| 5,224,112 | 6/1993 | Uesaka | 372/38 |
| 5,291,505 | 3/1994 | Nielsen | 372/38 |
| 5,303,248 | 4/1994 | Gibbs | 372/25 |
| 5,349,591 | 9/1994 | Weston et al. | 372/25 |
| 5,352,405 | 10/1994 | Beaman et al. | 419/45 |
| 5,430,666 | 7/1995 | DeAngelis et al. | 364/571.01 |
| 5,648,976 | 7/1997 | Franck et al. | 372/25 |
| 5,949,566 | 9/1999 | Takano | 372/25 X |
| 6,028,870 | 2/2000 | Deutsch et al. | 372/25 |

*Primary Examiner*—Brian Healy
*Attorney, Agent, or Firm*—Anderson, Levine & Lintel

[57] ABSTRACT

A laser power control system (150; 150') having a first pulse stretch capability, as may be used in a rapid prototyping system (100), is disclosed. According to one disclosed embodiment, a one-shot multivibrator (156) generates a pulse responsive to a gate signal (LON/LOFF_) indicating that the laser (110) is to be turned on. The pulse, which is of a selected duration suitable for achieving population inversion, is applied to the laser (110); upon the end of this pulse, pulse-width-modulation (PWM) control of the laser begins. According to another disclosed embodiment, a first pulse stretch store (166) retains a digital value corresponding to the duration by which the first PWM pulse is to be lengthened; adders (176; 178) add this digital value to the parameters indicated by the desired laser power signal (DLP) to ensure population inversion and laser output of the laser (110) in the first pulse.

17 Claims, 3 Drawing Sheets

LASER POWER CONTROL WITH STRETCHED INITIAL PULSES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of laser power control, and is more specifically directed to pulse-width modulated laser power control.

As is fundamental in the art, laser emission is achieved by the stimulated emission of photons from a laser medium, which may be a gas (e.g., $CO_2$, Ar), solid material (e.g., Nd:YAG), liquid (e.g., dye lasers), or semiconductor (e.g., GaAlAs). Typically, electrons in the medium are pumped, or excited, to an upper energy level, above the ground state. The state at which sufficient electrons have been excited into the upper energy level to sustain the laser reaction is referred to in the art as population inversion. Some of the excited electrons spontaneously emit a photon, and drop to an energy level that is the excited state less the energy corresponding to the wavelength of the emitted photon. These emitted photons will, in turn, cause other electrons in the population inversion to similarly emit photons, resulting in the generation of coherent light (i.e., the well-known laser beam). Positive feedback techniques, such as parallel mirror optical feedback, permit the laser to oscillate, further increasing the beam energy.

As is evident from the foregoing description, and as is well known in the art, laser pumping requires significant energy to be absorbed by the laser medium before the laser reaction is initiated. In the case of pulse-width-modulated (PWM) lasers, the laser pump is either fully on or fully off at any instant, operating at a duty cycle according to the desired average laser power. However, energy of the laser medium will decay from the excited state toward the ground state over such time as the laser pump is off. After a significant off time (such as between laser pulses), the time required for the laser pump to again excite the medium into a population inversion may be significant, particularly relative to the duration of the first pulse in a PWM pulse stream. Indeed, at high PWM frequencies (i.e., short "on" pulses) and low duty cycles, the pulse width of the first "on" pulse may not be sufficiently long to reach the lasing threshold, in which case the laser may not emit energy at all during the first pulse. Accuracy in the generation of laser power during this first pulse after a significant time off is thus greatly compromised.

One conventional approach to addressing the first pulse problem is referred to in the art as a "tickle" scheme. According to this approach, which for example is used in $CO_2$ lasers available from Synrad, Inc., the laser medium is constantly excited to a level just below the lasing threshold, for example by way of a low duty cycle pulse stream. In this condition, the time required to reach population inversion is kept very short, as the laser medium is energized (in theory) to a level that is only slightly below population inversion. Upon turning on the laser, the time required to raise the energy of the laser medium into population inversion is thus much reduced, such that the first pulse in the PWM stream is likely to generate the desired laser power. The "tickle" scheme has certain limitations, however, as its accuracy is quite dependent upon each particular laser; if the "tickle" duty cycle is too high for a particular laser, the laser may lase even in its "off" state. Because conventional lasers may degrade over time and use, a "tickle" duty cycle that is properly set for a laser at the beginning of its life may be inaccurate, and cause result in undesired lasing during "off" cycles, in later life.

Another conventional approach to addressing the first pulse problem is the implementation of a separate excitation amplifier, for example an RF excitation amplifier as used in $CO_2$ lasers available from Coherent, Inc. The separate excitation amplifier is set to maintain the laser medium at an excited state slightly below population inversion, similarly as in the "tickle" process described above. The output of the excitation amplifier must also be precisely set for each laser and its expected operating conditions. If the excitation amplifier is set too high, undesired lasing during "off" periods may occur; conversely, if the excitation amplifier is set too conservatively, the turn-on characteristics of the laser may be less than desired, particularly at low PWM duty cycles.

Another known operation technique in the field of lasers is referred to as "Q-switching" (or, alternatively, "Q-spoiling"). Q-switching is commonly used to generate a high power pulse from a laser by switchably lowering the Q factor of the resonating laser, for example by inserting a damping element into the laser, allowing energy to build up in the laser medium without emission of significant light. At such time as the pulse is desired, generally after the medium is excited well beyond the population inversion level, the Q factor is again raised (for example, by removing a damping element in the laser), releasing a large pulse of laser energy. Q-switching is commonly used in continually-pumped, solid-state lasers. In the example of solid-state laser, the damping element is placed in the optical path to prevent oscillation until the time that the laser pulse is desired. The turn-on time of Q-switched lasers is quite fast, given that the medium is maintained at an energy level above population inversion prior to switching. However, as is well known in the art, the Q-switch adds significant cost into the laser, especially considering the cost of the absorber (e.g., Pockels cell).

The sensitivity to inaccuracy of the laser power in a first pulse is exacerbated in some laser applications. For example, one use of lasers in the art is the fabrication of three-dimensional articles in layer-wise fashion through the selective polymerization of photopolymer liquid (as in the well-known stereolithography process), through the selective fusing, melting, or sintering of powder (as in the well-known selective laser sintering process), or through laminated object manufacturing (LOM). In these types of manufacturing methods, laser power is a critical parameter in the fabrication of structurally sound articles.

By way of background, an example of a rapid prototyping technology is the selective laser sintering process practiced in systems available from DTM Corporation of Austin, Tex., in which articles are produced from a laser-fusible powder in layerwise fashion. According to this process, a thin layer of powder is dispensed and then fused, melted, or sintered, by laser energy that is directed to those portions of the powder corresponding to a cross-section of the article. Conventional selective laser sintering systems, such as the SINTERSTATION 2500 system available from DTM Corporation, position the laser beam by way of galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The laser may be scanned across the powder in raster fashion, with modulation of the laser effected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers (as appropriate for the article), until the article is complete.

Detailed description of the selective laser sintering technology may be found in U.S. Pat. No. 4,863,538, U.S. Pat. No. 5,017,753, U.S. Pat. No. 5,076,869, and U.S. Pat. No. 4,944,817, all assigned to Board of Regents, The University of Texas System, and in U.S. Pat. No. 4,247,508 assigned to DTM Corporation, all incorporated herein by this reference. Description of a laser power control system in such a selective laser sintering system, in which the power of the laser is controlled according to the speed of the laser scan to provide a constant laser power output, is provided in copending U.S. application Ser. No. 08/866,600, filed May 30, 1997, assigned to DTM Corporation, and also incorporated by reference hereinto. The selective laser sintering technology has enabled the direct manufacture of three-dimensional articles of high resolution and dimensional accuracy from a variety of materials including wax, polycarbonate, nylon, other plastics, and composite materials such as polymer coated metals and ceramics. Wax parts may be used in the generation of tooling by way of the well-known "lost wax" process.

The thermal fusing mechanism in the selective laser sintering process depends upon the laser energy flux density, which is the thermal energy received to each location of powder per unit time. The laser flux density depends upon the laser energy, the laser spot size, and the temporal duration of the exposure of the powder to the laser energy. For most materials, the shape and density of the article being formed is sensitive to the laser energy flux density, such that even slight deviations in the laser energy flux density result in less than ideal article attributes. For example, if the laser energy flux density is too low, the article will be mechanically weak; conversely, excessive laser energy flux density can result in poor fidelity of the article dimensions relative to the CAD representation, overheating of the powder, or even burning of the powder.

The effects of non-uniformity of laser energy flux density have been observed in articles fabricated by selective laser sintering, especially in the sensitive materials noted above. It is contemplated that excessively low laser power in the initial laser pulse of a scan of the fusible material, such as may result from the delay in excitation of the laser medium to population inversion, will cause incomplete formation at the edges of the article, resulting in dimensional distortion of the object or reduced structural strength. Such sensitivity to laser power in the initial pulse is contemplated to not only affect the quality of articles formed by selective laser sintering technology, but also in other laser-based technologies such as stereolithography in which inadequate photocuring at article edges may result from loss of laser power in initial pulses.

BRIEF SUMMARY OF THE INVENTION

It is therefore an object of the present invention to provide a laser power control function and method of operating the same in which the desired power level is obtained for the first laser pulse after a significant laser off-time.

It is a further object of the present invention to provide such a function and method that is suitable for rapid prototyping systems, such as selective laser sintering systems and stereolithography systems.

It is a further object of the present invention to provide such a function and method in which undesired lasing during off cycles is prevented.

It is a further object of the present invention to provide such a function and method that may be efficiently implemented into conventional laser power control systems, at minimal cost.

Other objects and advantages of the present invention will be apparent to those of ordinary skill in the art having reference to the following specification together with its drawings.

The present invention may be implemented into a laser control system in which a gate signal, indicative of a laser "on" period, enables the production of an extended pulse signal. The extended pulse signal is added to the pulse width of the first laser pulse, to ensure that the laser medium reaches population inversion and so that the laser output is obtained in the first pulse. According to a particular implementation of the present invention, the laser control system is implemented into a rapid prototyping system, such as a selective laser sintering system, so that initial laser pulses applied to the fabrication material have the desired power level, so that high fidelity articles are produced.

DETAILED DESCRIPTION OF THE INVENTION

As will become apparent from the following description, the present invention may be utilized in connection with laser control systems generally, regardless of the particular application of the laser to be controlled. However, it has been observed that the present invention is particularly beneficial when applied to rapid prototyping systems that utilize lasers in the fabrication of articles from computer-aided-design (CAD) or computer-aided-manufacturing (CAM) databases. Accordingly, the following description will be directed to such a rapid prototyping system, specifically a selective laser sintering system; based on the foregoing, however, it is to be understood that the present invention may be used to benefit in other types of rapid prototyping systems (e.g., stereolithography and LOM systems) as well as other uses of laser energy.

Figure 1:
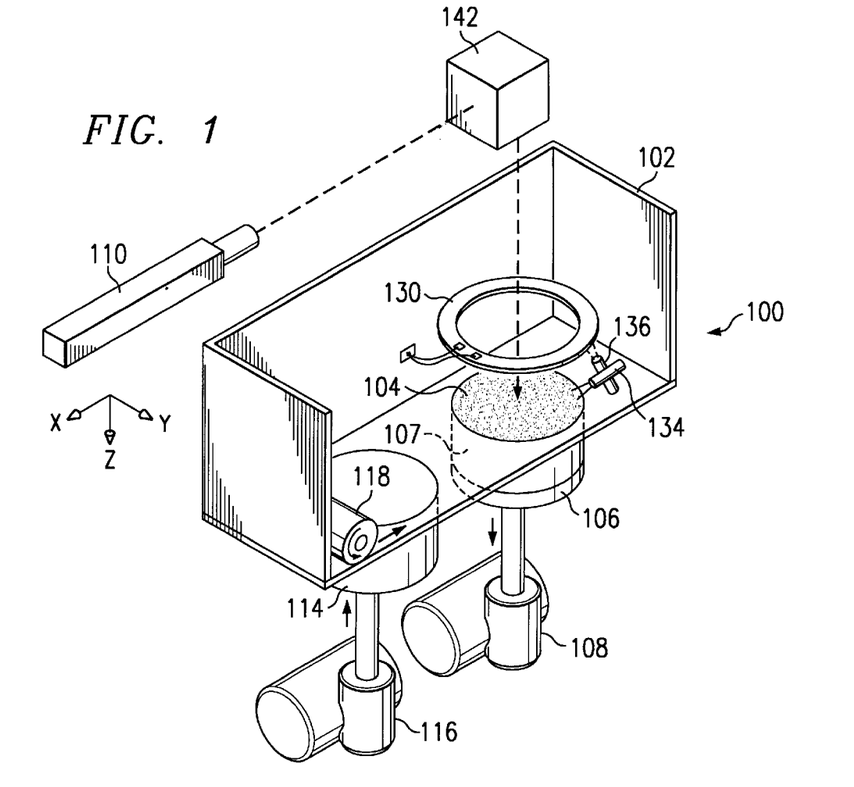
FIG. 1 is a perspective cutaway and schematic view of a selective laser sintering system according to the preferred embodiment of the invention.

Referring first to FIG. 1, the construction and operation of selective laser sintering system 100 will be described, for purposes of explanation of the preferred embodiments of the present invention. As shown in FIG. 1, selective laser sintering system 100 includes a chamber 102 (the front doors and top of chamber 102 not shown in FIG. 1, for purposes of clarity). Chamber 102 maintains the appropriate temperature and atmospheric composition (typically an inert atmosphere such as nitrogen) for fabrication of the article therein.

The powder delivery system in system 100 includes feed piston 114, controlled by motor 116 to move upwardly and lift a volume of powder into chamber 102; part piston 106, controlled by motor 108, moves downwardly below the floor of chamber 102 by a small amount, for example 5 mils, to define the thickness of each layer of powder to be processed. Roller 118 is a counter-rotating roller that translates powder from feed piston 114 to target surface 104. Target surface 104, for purposes of the description herein, refers to the top surface of heat-fusible powder (including portions previously sintered, if present) disposed above part piston 106; the sintered and unsintered powder disposed on part piston 106 will be referred to herein as part bed 107.

As described in the above-referenced U.S. Pat. No. 5,017,753, roller 118 (preferably provided with a scraper to prevent buildup, such a scraper not shown in FIG. 1 for clarity) spreads the powder within chamber 102 and over target surface 104 by its translation from feed piston 114 toward and across target surface 104 at the surface of part bed 107 above part piston 106. It is preferable, for smooth and thorough distribution of the powder, that the amount of powder provided by feed piston 114 be greater than that which can be accepted at the surface of part bed 107, so that some excess powder will result from the motion of roller 118 across target surface 104; this may be accomplished by the raising of feed piston 114 above the floor of chamber 102 by a greater distance that the distance below the floor of chamber 102 that part piston 106 is lowered (e.g., 10 mils versus 5 mils). It is also preferable to slave the counter-rotation of roller 118 to the translation of roller 118 within chamber 102, so that the ratio of rotational speed to translation speed is constant. It may be preferred to provide two powder pistons 114 on either side of part piston 106, for purposes of efficient and flexible powder deliver, as used in the SINTERSTATION 2500 system available from DTM Corporation.

Fabrication of a cross-section of the desired article or articles is effected by laser 110, which provides a beam which is directed by scanning system 142 in the manner described in the U.S. Patents referred to hereinabove and as will now be described relative to FIG. 2. Laser 110 includes, in addition to a laser itself, such conventional control elements as described in the above-referenced U.S. Pat. No. 4,863,538, including for example a front mirror assembly, and focusing elements such as diverging and converging lenses. The type of laser 110 used depends upon many factors and in particular upon the type of powder that is to be sintered. For many types of conventional powders, a preferred laser is a 50 watt $CO_2$ type laser with controllable power output. Laser 110, when on, emits laser beam 105 that travels generally along the path shown by the arrows in FIG. 2.

Computer 140 and scanning system 142 are included for controlling the direction of the laser beam 105 as it impinges target surface 104. In this preferred embodiment of the invention, computer 140 includes a controlling microprocessor for scanning system 142 and further includes a system for storing the CAD/CAM data base, in slice-by-slice form, to defines the dimensions of the article or articles being produced. A conventional personal computer workstation, such as a personal computer based on a Pentium-class microprocessor and including floating point capabilities, is suitable for use as computer 140 in the preferred embodiment of the invention. Computer 140 generates signals on lines AIM to scanner processor 103, in scanning system 142, to direct laser beam 105 across target surface 104 according to the cross-section of the article to be produced in the current layer of powder.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147, which are driven by respective galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. Scanner processor 103 in scanning system 142 controls the movement of galvanometers 148, 149 to control the aim of laser beam 105 within target surface 104, in response to the signals on lines AIM from computer 140 that are generated according to the CAD/CAM data base stored therein that defines the cross-section of the article to be formed in the layer of powder at target surface 104.

In addition, computer 140 generates signals to laser power control system 150 on line DLP to indicate the desired level of power to be delivered by laser 110 when on. Scanner processor 103 generates signals on line LON/LOFF_ indicating the times at which laser 110 is to be turned on or off according to the CAD/CAM data base representation of the slice of the article for the current layer of powder. According to the preferred embodiments of the invention, the signals on line LON/LOFF_, in combination with feedback signals on one or more lines FB generated by scanner processor 103, controls laser power control system 150 to produce a time-varying signal to laser 110 on line LP corresponding to the instantaneous power to be delivered. As described in the above-incorporated copending application Ser. No. 08/866,600, filed May 30, 1997, the feedback signals on lines FB may include an indication of the position or velocity of galvanometers 148, 149 (and thus mirrors 146, 147), for use in controlling laser 110 to deliver laser energy at a constant instantaneous power level; alternatively or in addition, the feedback signals on lines FB may include signals corresponding to the actual laser power delivered, to assist in the operation of laser power control system 150. As will become apparent from the following description, laser power control system 150 according to the preferred embodiments of the present invention controls laser 110 to deliver the desired laser energy flux density to the powder. While laser power control system 150 is illustrated as a separate component in FIG. 2, laser power control system 150 may of course be implemented within computer 140 or scanner processor 103, if desired.

Figure 3:
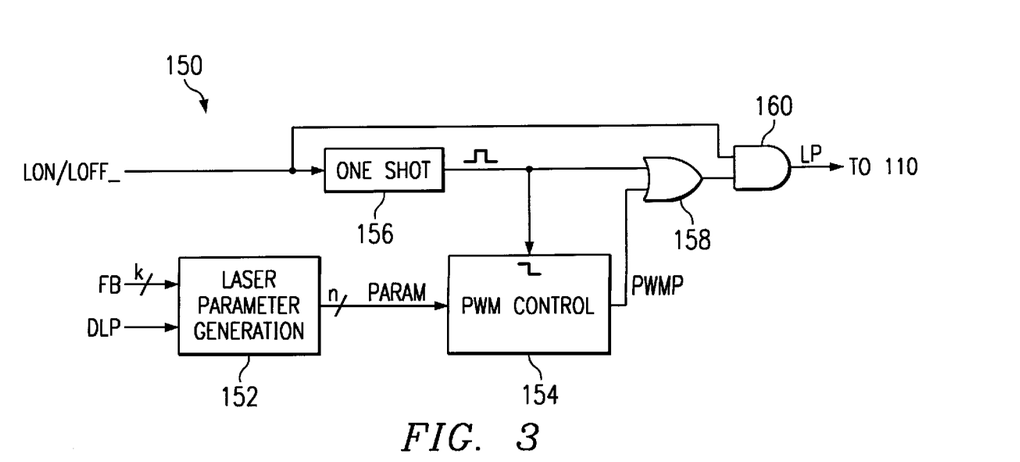
FIG. 3 is a functional block diagram of a laser power control system according to a first embodiment of the invention.

Referring now to FIG. 3, laser power control system 150 according to a first preferred embodiment of the present invention will now be described in detail. As illustrated in FIG. 3, the feedback signals on lines FB and the desired laser power signal on line DLP are received by laser parameter generation circuitry 152 in laser power control system 150. In response to these signals, laser parameter generation circuitry 152 generates signals, on lines PARAM, that indicate the desired laser power to be produced by laser 110; lines PARAM are applied to inputs of pulse width modulation control circuitry 154. In response to the signals on lines PARAM, pulse width modulation control circuitry 154, generates pulse-width modulated pulses on line PWMP, at the desired frequency and duty cycle, for application to laser 110 via OR gate 158 and AND gate 160 as will be described hereinbelow. PWM control circuitry 154 may be implemented by way of conventional circuits, such as the Am9513 counter/timer integrated circuit available from Advanced Micro Devices.

According to this embodiment of the invention, laser power control system 150 further includes one-shot multivibrator 156, which receives the gate signal on line LON/LOFF_ from scanner processor 103 that indicates (when active high) that laser 110 is to be turned on. One-shot multivibrator 156 may be implemented by way of conventional circuitry, such as the well-known 555 timer circuits and the TTL 74121 family, available from multiple sources in the industry. The duration of the pulse generated by one-shot multivibrator 156 is selected to be of sufficient duration to pump laser 110 to population inversion, assuming the worst case of off-time of laser 110. For example, in the case where laser 110 is an LC-50 laser available from DEOS, the duration of the pulse generated by one-shot multivibrator 156 is preferably on the order of 20 $\mu$sec. Line LON/LOFF_ is also applied to one input of AND gate 160, which receives the output of OR gate 158 at its other input; OR gate 158 receives the output of one-shot multivibrator 156 at one input and receives line PWMP from PWM control circuitry 154 at its other output. The output of one-shot multivibrator 156 is also applied to a negative-edge triggered control input of PWM control circuit 154, to enable PWM control circuitry 154 with its falling edge.

In operation, laser parameter generation circuitry 152 generates the appropriate operation parameters for operation of laser 110 in response to the signals on lines FB and DLP; these parameters may be generated in preparation for the initial pulse of laser 110 (i.e., prior to receipt of an active gate signal on line LON/LOFF_). Upon scanner processor 103 initiating a laser pulse operation, for example at the beginning of a scan of a region of powder at target surface 104 at which a cross-section of the desired article is to be formed, line LON/LOFF_ makes a low-to-high transition. This transition of line LON/LOFF_ causes one-shot multivibrator 156 to issue a pulse at its output. This pulse is applied to OR gate 158 and thus to AND gate 160. Since line LON/LOFF_ is itself active at this time, the pulse generated by one-shot multivibrator 156 is forwarded by AND gate 160 to laser 110, on line LP. During the pulse generated by one-shot multivibrator 156 responsive to the transition of line LON/LOFF_, PWM control circuitry 154 is disabled from generating pulses on line PWMP (as PWM control circuitry 154 is enabled by the falling edge of the pulse generated by one-shot multivibrator 156).

The pulse generated by one-shot multivibrator 156 to laser 110 is thus provided as the initial pulse by way of which laser 110 is turned on, in response to scanner processor 103 driving line LON/LOFF_ high. This pulse pumps laser 110 to population inversion, until the generation of the pulse-width modulation signals on line PWMP, which begins at the end of the pulse generated by one-shot multivibrator 156. The falling edge of the pulse from one-shot multivibrator 156 enables PWM control circuitry 154 to begin generation of the PWM waveform on line PWMP, which is then forwarded by OR gate 158 and AND gate 160 (line LON/LOFF_ remaining active) to laser 110 on line LP. Since laser 110 has already been pumped to population inversion by the pulse from one-shot multivibrator 156, laser 110 begins emission of laser energy at the desired power under the control of PWM control circuitry 154.

According to this first embodiment of the present invention, a small "glitch" or inactive pulse may be presented on line LP to laser 110, such a glitch appearing between the end of the pulse generated by one-shot multivibrator 156 and prior to the initiation of the PWM waveform on line PWMP. It is contemplated, however, that this inactive pulse will be insignificant, considering the switching time of conventional electronic components and the response time of laser 110.

Alternatively to the specific example illustrated in FIG. 3, PWM control circuitry 154 may be triggered or enabled by the gate signal on line LON/LOFF_ (rather than by the falling edge of the output of one-shot multivibrator 156, as in the case of laser power control circuit 150 of FIG. 3). While this alternative approach is not as repeatable as that described above relative to FIG. 3, this approach is useful in connection with systems in which the gate signal on line LON/LOFF_ is not synchronized with the pulse width modulation waveform.

According to the first embodiment of the invention, therefore, a "stretched" first pulse is applied to laser 110 as the initial pulse of the pulse-width modulated waveform. This stretched first pulse, the duration of which is defined by one-shot multivibrator 156, pumps laser 110 from its off-state to population inversion, such that the initial PWM pulse is capable of generating laser energy output from laser 110. In this way, accurate laser energy generation is achieved, without the risk of undesired laser output during off periods.

Figure 4:
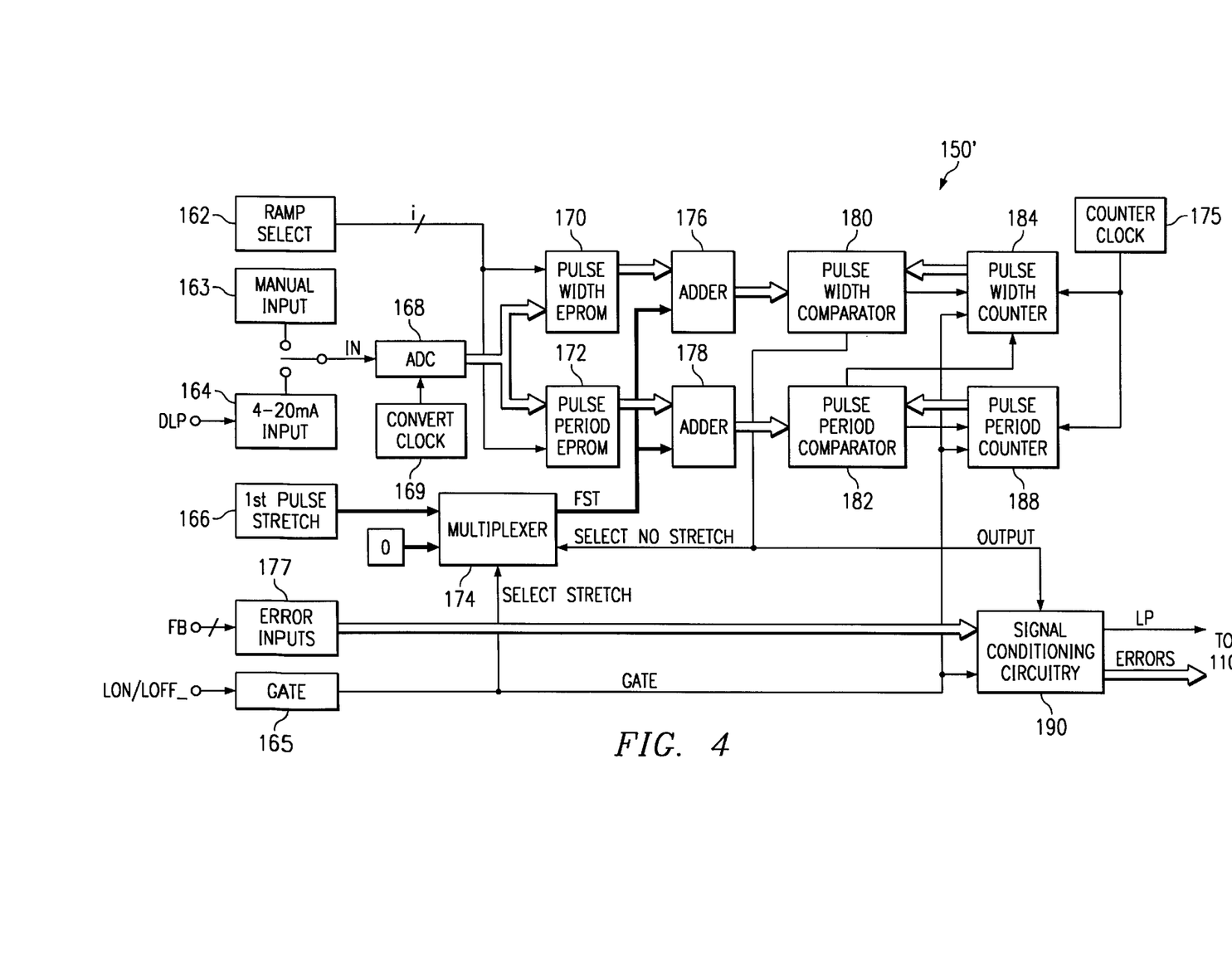
FIG. 4 is a functional block diagram of a laser power control system according to a second embodiment of the invention.

Referring now to FIG. 4, laser power control circuit 150' according to a second preferred embodiment of the present invention will now be described. This second embodiment of the invention is particularly beneficial in providing pulse-width modulated laser control in a manner that permits dynamic or programmable control of the PWM frequencies and duty cycles. The following description of laser power control circuit 150' will be presented in a form suitable for implementation by discrete integrated circuits; it is contemplated, and to be understood, however, that laser power control circuit 150' may be realized by way of customized programmable logic, or by way of higher-order instruction-programmed logic circuitry such as a microprocessor or digital signal processor (DSP).

As illustrated in FIG. 4, laser power control circuit 150' includes power input circuit 164, which receives a desired laser power signal (e.g., ranging from 4 to 20 mA) on line DLP from scanner processor 103; manual input 163 is also provided to receive a user-defined input, for example from a knob, slide switch, or keyboard input. The selected input source (manual input 163 or power input circuit 164) drives line IN, which is applied to an input of analog-to-digital converter (ADC) 168. ADC 168, based upon a clock signal generated by conversion clock 169, produces a k-bit digital word corresponding to the desired power level of laser 110, and applies this digital word to pulse width memory 170 (configured as electrically programmable read-only memory, or EPROM), and to pulse period memory 172 (also configured as EPROM). Ramp select circuit 162 generates a signal that is also applied to pulse width and pulse period EPROMs 170, 172, by way of which the PWM duty cycle and frequency bases may be selected. The outputs of pulse width EPROM 170 and pulse period EPROM 172 are applied to adders 176, 178, respectively.

Laser power control circuitry 150' further includes counter clock 175, which applies a periodic signal to pulse width counter 184 and pulse period counter 188, each of which advance a digital count word with each period of the signal from counter clock 175. Pulse width comparator 180 compares the count generated by pulse width counter 184 against a pulse width value from pulse width EPROM 170 communicated by adder 176, and pulse period comparator 182 compares the count generated by pulse period counter 188 against a pulse period value from pulse period EPROM 172 communicated by adder 178. In response to the current pulse width count being less than the pulse width value from adder 176, pulse width comparator 180 issues an active signal at its output which, via signal conditioning circuitry 190, drives an active signal on line LP to laser 110. Upon the pulse width count reaching the value established by adder 176, the output signal is deactivated; upon the pulse period count reaching the value established by adder 178, both the pulse width counter 184 and the pulse period counter 188 are reset, and the process begins again for the next PWM cycle.

Error signals are received by error input circuit 177, and forwarded to signal conditioning circuitry 190, which itself generates additional error signals for use in feedback control, as shown in FIG. 4.

According to this second embodiment of the present invention, laser power control circuit 150' further includes first pulse stretch circuit 166 and multiplexer 174. First pulse stretch circuit 166 is simply a register or other digital store which retains a digital word corresponding to the length of time (in periods of the clock signal from counter clock 175) by which the initial laser pulse is to be lengthened from that which would otherwise be determined by the pulse width modulation process. For example, the generation of a 20 μsec pulse for a DEOS LC-50 laser 110, where counter clock 175 operates at 66.67 MHz, may be implemented by a digital word of 535 h stored in first pulse stretch circuit 166. The output of first pulse stretch circuit 166 is applied to one input of multiplexer 174, which receives a "zero" value at its other input. Multiplexer 174 is controlled by gate 165, which receives gating signal LON/LOFF_ from scanner processor 103 at its input; gate 165 generates a gate signal on line GATE that is applied to multiplexer 174, pulse width counter 184, and pulse period counter 188, to indicate the presence of an initial pulse of a PWM waveform. This signal on line GATE is also applied to signal conditioning circuitry 190. Multiplexer 174 is also controlled by the output of pulse width comparator 180, as will be described in detail hereinbelow. The output of multiplexer 174, on lines FST, is applied to both of adders 176, 178, as shown in FIG. 4.

In operation, laser power parameters are generated by pulse width EPROM 170 and pulse period EPROM 172, in response to the ramp select signal from ramp select 162, and in response to the input power signal on line IN (from either manual input 163 or power input 164), converted to digital form by ADC 168. The digital word from ADC 168 is applied to each of pulse width and pulse period EPROMs 170, 172, and the outputs from EPROMS 170, 172 are applied to adders 176, 178, respectively. This setting of the laser parameters may be accomplished prior to the initiation of a PWM waveform.

Figure 2:
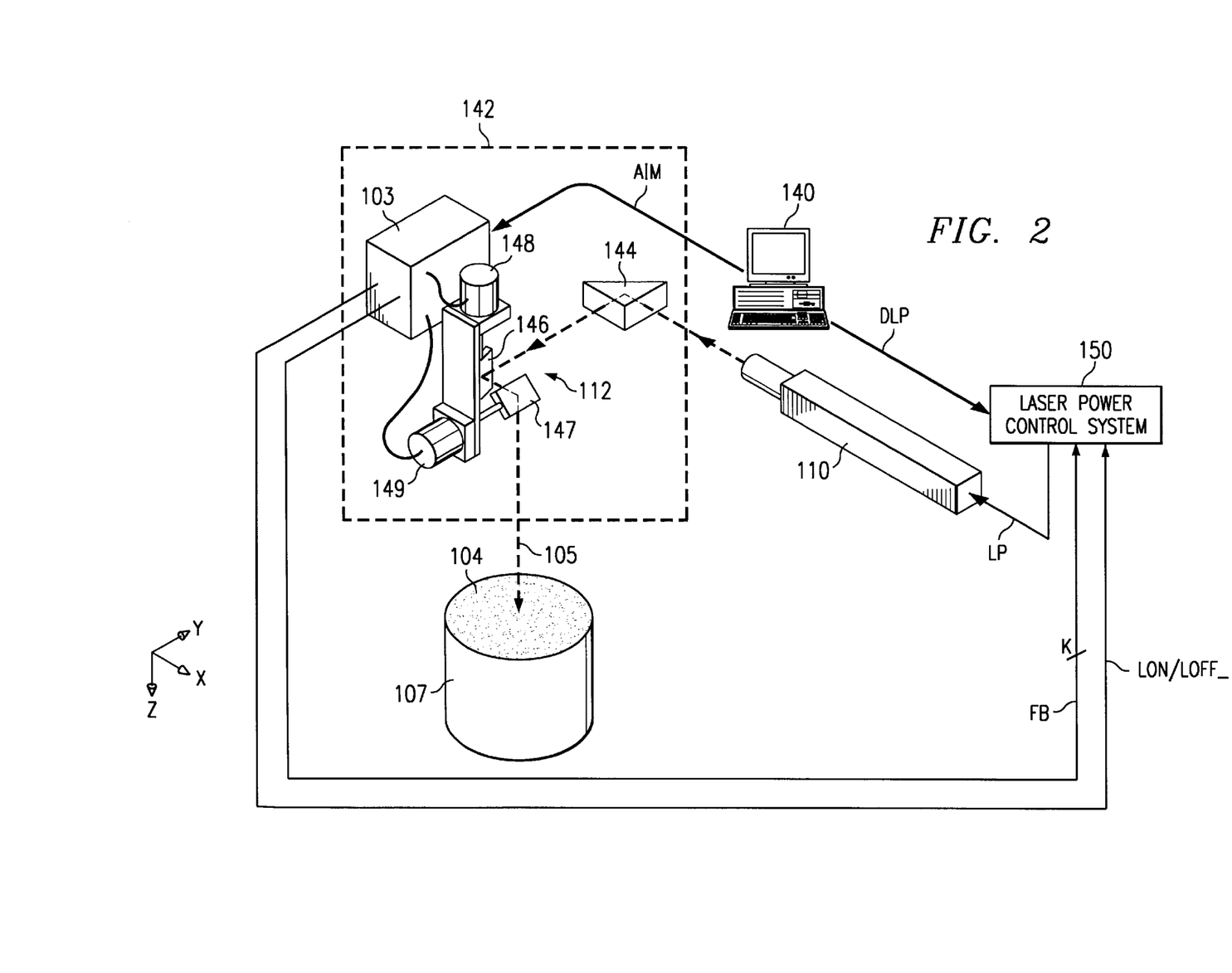
FIG. 2 is a perspective cutaway and schematic view of the laser control system according to the preferred embodiment of the invention.

In the selective laser sintering example of FIGS. 1 and 2, at the beginning of a scan of a portion of the powder at target surface 105, gate 165 receives signal LON/LOFF_ in an active state, indicating that laser 110 is to be turned on (after having been turned off). Gate 165 in turn issues a signal on line GATE to control multiplexer 174 to select the output of first pulse stretch circuit 166 for application to lines FST, and thus to adders 176, 178. This signal on line GATE is also forwarded to pulse width counter 184 and to pulse period counter 188, resetting each. Counter clock 174 advances the counts of pulse width counter 184 and pulse period counter 188, with these counts being applied to pulse width comparator 180 and pulse period comparator 182, respectively. During this first pulse after signal LON/LOFF_ being active, in which multiplexer 174 is applying the output of first pulse stretch circuit 166 to adders 176, 178, the values against which pulse width comparator 180 and pulse period comparator 182 compare the counts from pulse width counter 184 and pulse period counter 188 are increased from the values determined by pulse width and pulse period EPROMs 170, 172. The amount of the increase is, of course, determined by the value presented by first pulse stretch circuit 166 and multiplexer 174 on lines FST. As a result, the duration of the pulse generated by pulse width comparator 180 and applied to signal conditioning circuitry 190, for application to laser 110 on line LP, is lengthened by the amount specified by first pulse stretch circuit 166; the pulse period is also lengthened by this same amount through operation of adder 178.

This lengthened, or "stretched", initial laser pulse is applied to laser 110 to pump the laser medium up to population inversion, so that laser output is obtained near the end of this first pulse; the accuracy of the amount of laser energy obtained from the first pulse is thus improved, particularly over those conventional arrangements in which the laser does not even initiate output in the initial pulse. Once population inversion is obtained, subsequent pulses in the PWM waveform then accurately generate the desired laser output.

Upon completion of the first pulse period, as determined by pulse period comparator 182, pulse width counter 184 and pulse period counter 188 are reset, and their respective counts begin again with each period of the clock from counter clock 175. Upon the second (and subsequent) pulses generated by pulse width comparator 180, however, multiplexer 174 is controlled to select the "zero" value for application to adders 176, 178 on lines FST, rather than the value from first pulse stretch circuit 166 (as in the case of the first pulse). Accordingly, the pulse width and pulse period values from EPROMs 170, 172, respectively, are used by pulse width comparator 180 and pulse period comparator 182 for the second and additional pulses in the PWM waveform; the pulse "stretching" is thus applied only to the first pulse, and not to subsequent pulses. This operation then continues until laser 110 is to be turned off, as indicated by line LON/LOFF_ being driven inactive by scanner processor 103.

According to this second embodiment of the present invention, therefore, the initial pulse of a PWM series of pulses is "stretched" by a duration defined by first pulse stretch circuit 166; as noted above, the desired duration of this stretch may be programmably selected and stored in first pulse stretch circuit 166. This stretching of the first pulse ensures population inversion and laser output from the initial PWM pulse, regardless of the length of time that the laser had been previously turned off. In this way, accurate laser energy generation is achieved in all cycles, without the risk of undesired laser output during off periods as may occur from conventional "tickle" approaches, and without the cost of Q-switching.

In each of the foregoing embodiments, therefore, improved laser accuracy is obtained, at relatively low cost.

This improved accuracy is especially important in certain applications, including those in rapid prototyping applications, such as selective laser sintering, stereolithography, and laminated object manufacturing. In such applications, the reliable generation of laser energy from the initial laser pulses ensures high fidelity in the dimensions and shapes of the articles being formed, as well as consistent structural strength throughout the article.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A laser power control system, comprising:
   circuitry for generating laser power parameters in response to a desired laser power signal;
   PWM circuitry for generating a series of pulses to be applied to a laser responsive to the laser power parameters from the generating circuitry; and
   initial pulse circuitry for generating an initial laser pulse, of a selected duration, to be applied to the laser responsive to a transition of a gate signal indicating that the laser is to be turned on.

2. A laser power control system comprising:
   circuitry for generating laser power parameters in response to a desired laser power signal;
   PWM circuitry for generating a series of pulses to be applied to a laser responsive to the laser power parameters from the generating circuitry; and
   initial pulse circuitry for generating a first laser pulse, of a selected duration, to be applied to the laser responsive to a gate signal indicating that the laser is to be turned on, the initial pulse circuitry comprising:
      a one-shot multivibrator, for generating the first laser pulse responsive to the gate signal; and
      a disjunctive logic function, having inputs coupled to the one-shot multivibrator and to the PWM circuitry, and having an output for presenting a pulse generated at either of its inputs.

3. The laser power control system of claim 2, further comprising:
   a conjunctive logic function, having an input coupled to the output of the disjunctive logic function and having an input receiving the gate signal, and having an output for presenting the pulse from either of the one-shot multivibrator or the PWM circuitry during such time as the gate signal is active.

4. The laser power control system of claim 2, wherein the PWM circuitry has an enable input coupled to the output of the one-shot multivibrator.

5. The laser power control system of claim 4, wherein the PWM circuitry is enabled responsive to the end of the first laser pulse generated by the one-shot multivibrator.

6. A laser power control system comprising:
   circuitry for generating laser power parameters in response to a desired laser power signal;
   initial pulse circuitry for generating a first laser pulse, of a selected duration, to be applied to the laser responsive to a gate signal indicating that the laser is to be turned on, the initial pulse circuitry comprising:
      a first pulse stretch store, for storing a value corresponding to a selected time duration by which an initial pulse of the laser is to be lengthened from that indicated by the laser parameters; and
   PWM circuitry for generating a series of pulses to be applied to a laser responsive to the laser power parameters from the generating circuitry, the PWM circuitry comprising:
      a pulse width limit circuit, for determining the duration of each PWM pulse; and
      a pulse width adder, for adding the selected time duration from the first pulse stretch store to the duration determined by the pulse width limit circuit, responsive to the gate signal.

7. The laser power control system of claim 6, wherein the PWM circuitry further comprises:
   a counter clock; and
   signal output circuitry, for presenting a PWM waveform for use by a laser;
   and wherein the pulse width limit circuit comprises:
      a pulse width counter, for advancing a pulse width count responsive to a clock signal generated by the counter clock;
      a pulse width memory, receiving a desired laser power signal at an input, and presenting, to the pulse width adder, a pulse width value responsive thereto; and
      a pulse width comparator, for comparing the result of the pulse width adder with the pulse width count, and for generating a pulse signal to the signal output circuitry responsive to the pulse width count being below the result of the pulse width adder.

8. The laser power control system of claim 7, wherein the PWM circuitry further comprises:
   a pulse period counter, for advancing a pulse period count responsive to a clock signal generated by the counter clock;
   a pulse period memory, receiving a desired laser power signal at an input, and presenting a pulse period value responsive thereto;
   a pulse period adder, for adding the selected time duration from the first pulse stretch store to the duration determined by the pulse period memory, responsive to the gate signal; and
   a pulse period comparator, for comparing the result of the pulse period adder with the pulse period count, and for resetting the pulse width counter and the pulse period counter responsive to the pulse period count reaching the result of the pulse period adder.

9. The laser power control system of claim 8, wherein the initial pulse circuitry further comprises:
   a multiplexer, having a first input coupled to the first pulse stretch store, having a second input set to zero, and having an output coupled to the pulse width adder and the pulse period adder, the multiplexer being controlled by the gate signal to select its first input responsive to the gate signal indicating that the laser is to be turned on, and controlled by the pulse width comparator to select its second input responsive to the pulse width comparator issuing a second pulse.

10. A rapid prototyping system, comprising:
   a container for a fusible substance, the container defining a target surface of the fusible substance;
   a laser, for emitting laser energy of a wavelength suitable for fusing irradiated locations of the fusible substance at the target surface;

a laser directional control system, for directing the laser energy at selected locations of the target surface corresponding to cross-sections of an article to be produced; and a laser power control system, comprising:
  circuitry for generating laser power parameters in response to a desired laser power signal;
  PWM circuitry for generating a series of pulses to be applied to the laser responsive to the laser power parameters from the generating circuitry; and
  initial pulse circuitry for generating a first laser pulse, of a selected duration, to be applied to the laser responsive to a gate signal indicating that the laser is to be turned on.

11. The rapid prototyping system of claim 10, wherein the initial pulse circuitry comprises:
  a one-shot multivibrator, for generating the first laser pulse responsive to the gate signal; and
  a disjunctive logic function, having inputs coupled to the one-shot multivibrator and to the PWM circuitry, and having an output coupled to the laser.

12. The rapid prototyping system of claim 11, further comprising:
  a conjunctive logic function, having an input coupled to the output of the disjunctive logic function and having an input receiving the gate signal, and having an output coupled to the laser.

13. The rapid prototyping system of claim 11, wherein the PWM circuitry has an enable input coupled to the output of the one-shot multivibrator.

14. The rapid prototyping system of claim 10, wherein the initial pulse circuitry comprises:
  a first pulse stretch store, for storing a value corresponding to a selected time duration by which an initial pulse of the laser is to be lengthened from that indicated by the laser parameters;
  wherein the PWM circuitry comprises:
    a pulse width limit circuit, for determining the duration of each PWM pulse; and
    a pulse width adder, for adding the selected time duration from the first pulse stretch store to the duration determined by the pulse width limit circuit, responsive to the gate signal.

15. The rapid prototyping system of claim 14, wherein the PWM circuitry further comprises:

a counter clock; and signal output circuitry, for presenting a PWM waveform for use by the laser;

and wherein the pulse width limit circuit comprises:
  a pulse width counter, for advancing a pulse width count responsive to a clock signal generated by the counter clock;
  a pulse width memory, receiving a desired laser power signal at an input, and presenting, to the pulse width adder, a pulse width value responsive thereto; and
  a pulse width comparator, for comparing the result of the pulse width adder with the pulse width count, and for generating a pulse signal to the signal output circuitry responsive to the pulse width count being below the result of the pulse width adder.

16. The rapid prototyping system of claim 15, wherein the PWM circuitry further comprises:
  a pulse period counter, for advancing a pulse period count responsive to a clock signal generated by the counter clock;
  a pulse period memory, receiving a desired laser power signal at an input, and presenting a pulse period value responsive thereto;
  a pulse period adder, for adding the selected time duration from the first pulse stretch store to the duration determined by the pulse period memory, responsive to the gate signal; and
  a pulse period comparator, for comparing the result of the pulse period adder with the pulse period count, and for resetting the pulse width counter and the pulse period counter responsive to the pulse period count reaching the result of the pulse period adder.

17. The rapid prototyping system of claim 16, wherein the initial pulse circuitry further comprises:
  a multiplexer, having a first input coupled to the first pulse stretch store, having a second input set to zero, and having an output coupled to the pulse width adder and the pulse period adder, the multiplexer being controlled by the gate signal to select its first input responsive to the gate signal indicating that the laser is to be turned on, and controlled by the pulse width comparator to select its second input responsive to the pulse width comparator issuing a second pulse.

* * * * *